(12) United States Patent
Wu et al.

(10) Patent No.: US 12,405,510 B2
(45) Date of Patent: Sep. 2, 2025

(54) DRIVING MECHANISM

(71) Applicant: TDK TAIWAN CORP., Taoyuan (TW)

(72) Inventors: Tso-Hsiang Wu, Taoyuan (TW);
Chao-Chang Hu, Taoyuan (TW);
Yung-Yun Chen, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 208 days.

(21) Appl. No.: 18/303,347

(22) Filed: Apr. 19, 2023

(65) Prior Publication Data

US 2023/0333447 A1  Oct. 19, 2023

Related U.S. Application Data

(60) Provisional application No. 63/332,424, filed on Apr. 19, 2022.

(51) Int. Cl.
| | |
|---|---|
| *G03B 9/06* | (2021.01) |
| *F03G 7/06* | (2006.01) |
| *G03B 7/10* | (2021.01) |
| *G03B 9/22* | (2021.01) |
| *G03B 30/00* | (2021.01) |
| *H02K 41/035* | (2006.01) |
| *G03B 13/36* | (2021.01) |

(52) U.S. Cl.
CPC ............. *G03B 9/06* (2013.01); *F03G 7/0614* (2021.08); *G03B 7/10* (2013.01); *G03B 9/22* (2013.01); *H02K 41/0354* (2013.01); *G03B 13/36* (2013.01); *G03B 30/00* (2021.01)

(58) Field of Classification Search
CPC ........... G03B 9/06; G03B 30/00; H04N 23/55
See application file for complete search history.

(56) References Cited

U.S. PATENT DOCUMENTS

| | | | | |
|---|---|---|---|---|
| 9,781,322 | B2 * | 10/2017 | Cho | H04N 23/57 |
| 10,996,545 | B2 * | 5/2021 | Zhuo | G03B 17/566 |
| 11,106,112 | B1 * | 8/2021 | Chiu | G03B 30/00 |
| 11,237,456 | B2 * | 2/2022 | Kazuo | G03B 9/22 |
| 11,422,432 | B2 * | 8/2022 | Chiu | F03G 7/0614 |
| 2019/0373145 | A1 * | 12/2019 | Yu | G02B 7/102 |
| 2022/0382128 | A1 * | 12/2022 | Lee | G03B 9/02 |
| 2023/0280635 | A1 * | 9/2023 | Kim | G03B 9/02 |
| | | | | 396/510 |

\* cited by examiner

*Primary Examiner* — Leon W Rhodes, Jr.
(74) *Attorney, Agent, or Firm* — MUNCY, GEISSLER, OLDS & LOWE, P.C.

(57) ABSTRACT

A driving mechanism for moving an optical unit is provided, including a variable aperture module and a Voice Coil Motor module. The variable aperture module has a bottom plate connected to a lens holder of the Voice Coil Motor module. Specifically, the variable aperture module and the Voice Coil Motor are received in the same housing, so as to enhance the structural strength of the driving mechanism.

16 Claims, 12 Drawing Sheets

DRIVING MECHANISM

CROSS REFERENCE TO RELATED APPLICATIONS

This application claims priority of U.S. Provisional Application No. 63/332,424, filed Apr. 19, 2022, the entirety of which is incorporated by reference herein.

BACKGROUND OF THE INVENTION

Field of the Invention

The application relates in general to a driving mechanism, and in particular, to a driving mechanism that has a variable aperture (VA).

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices to consumers.

Electronic devices that have image-capturing or video-recording functions normally include an optical module, and require functions of using an optical element driving mechanism to adjust the size of an aperture in order to change amount of light entering the module. Light may pass through the optical module and the optical element driving mechanism and may form an image on an optical sensor. However, the trend in modern mobile devices is to have a smaller size and a higher durability. As a result, how to effectively reduce the size of the optical module and how to increase its durability has become an important issue.

BRIEF SUMMARY OF INVENTION

In view of the aforementioned problems, the object of the invention is to provide a driving mechanism for moving an optical element. The driving mechanism includes a movable part, a connecting part, a first driving unit, a holder, a base, and a second driving unit. The movable part is connected to the first optical unit. The connecting part is connected to the movable part. The first driving unit is configured to impel the movable part and the first optical unit relative to the connecting part. The holder is connected to the second optical unit and the connecting part. The base is connected to the holder. The second driving unit is configured to impel the holder and the second optical unit relative to the base.

In some embodiments, the first driving unit comprises an SMA element.

In some embodiments, the driving mechanism further includes a housing connected to the base, wherein the connecting part, the movable part, the first driving unit, the holder, the base, and the second driving unit are received in the housing.

In some embodiments, the holder has a connection surface affixed to the connecting part, and the connection surface is covered by the housing when viewed along an optical axis of the second optical unit.

In some embodiments, the driving mechanism further includes a spring sheet connecting the base to the holder, wherein the spring sheet is covered by the housing when viewed along an optical axis of the second optical unit.

In some embodiments, the housing forms a hole, and the width of the hole is less than the width of the second optical unit.

In some embodiments, the holder forms a protrusion extending toward and connecting to the connecting part.

In some embodiments, the connecting part includes a frame and a bottom plate, and the protrusion is connected to the bottom plate.

In some embodiments, the connecting part forms a protruding portion extending toward and connecting to the holder.

In some embodiments, the connecting part includes a frame and a bottom plate, and the protruding portion is formed on the bottom plate.

In some embodiments, the second optical unit extends into the connecting part.

In some embodiments, the second driving unit includes a coil disposed on the holder and a magnetic element disposed on the base.

In some embodiments, the first driving unit comprises an SMA element that has a first length when the movable part is in a first position relative to the connecting part, and when a current signal is applied to the SMA element, the SMA element shrinks from a first length to a second length and impels the movable part from the first position to a second position relative to the connecting part.

In some embodiments, the driving mechanism further includes a slider movably disposed on the movable part and connected to the SMA element, wherein the connecting part forms a longitudinal guiding structure, the slider contacts a first end of the guiding structure when the movable part is in the first position relative to the connecting part, and when the slider is impelled by the SMA element along the guiding structure from the first end to a second end of the guiding structure, the movable part is pushed by the slider from the first position to the second position.

In some embodiments, the guiding structure comprises a longitudinal slot.

In some embodiments, the connecting part has a polygonal shape, and a tilt angle is formed between the guiding structure and a side of the connecting part.

In some embodiments, the tilt angle is 45 degree.

In some embodiments, the movable part has an annular structure that forms a longitudinal rail, and the slider extends through the rail to the guiding structure.

In some embodiments, the rail extends in a first direction, and the guiding structure extends in a second direction that is neither parallel nor perpendicular to the first direction.

In some embodiments, an included angle is formed between the first and second directions, and the included angle ranges from 20 degree to 70 degree.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
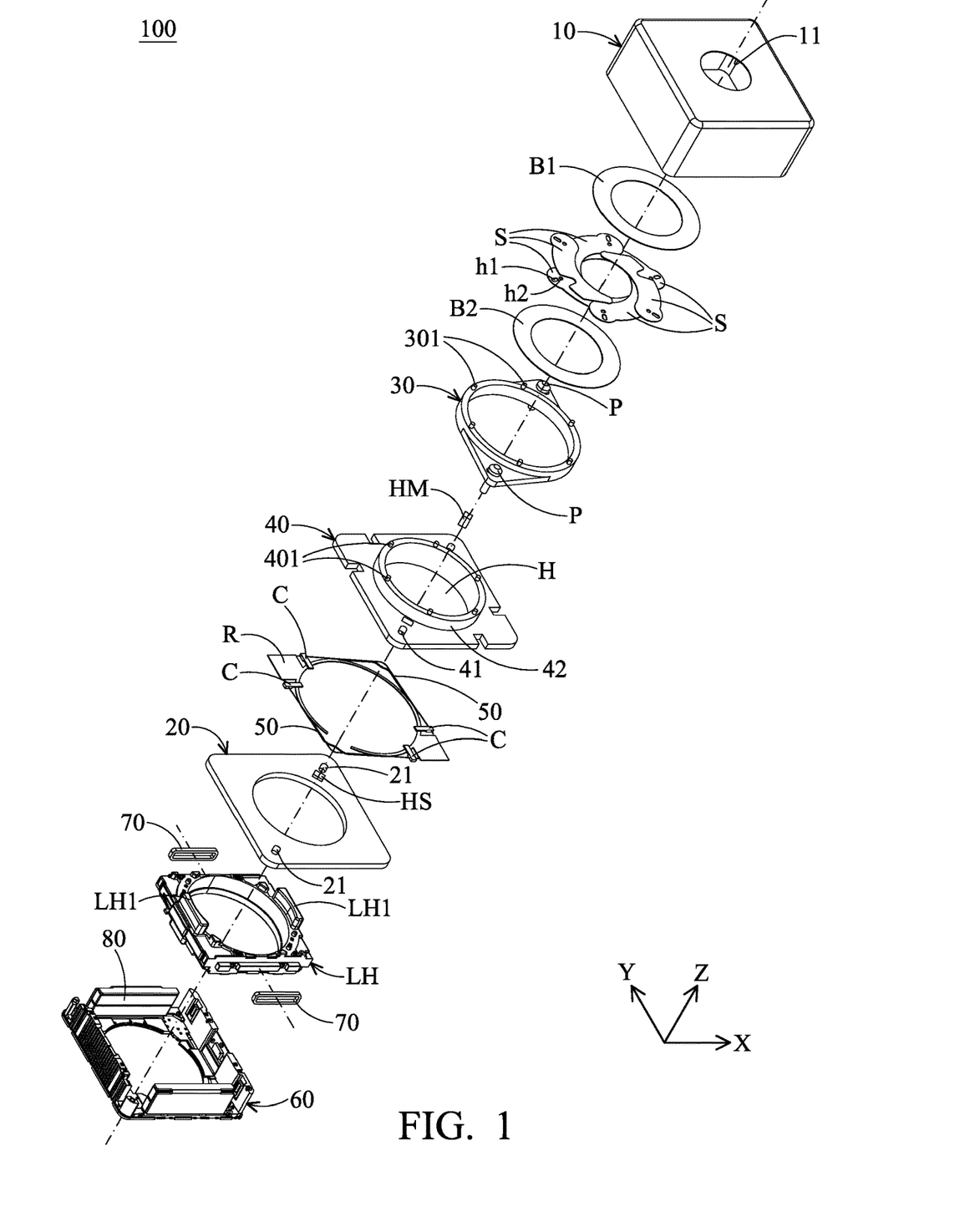
FIG. 1 is an exploded diagram of a driving mechanism 100 in accordance with an embodiment of the invention.
Figure 2:
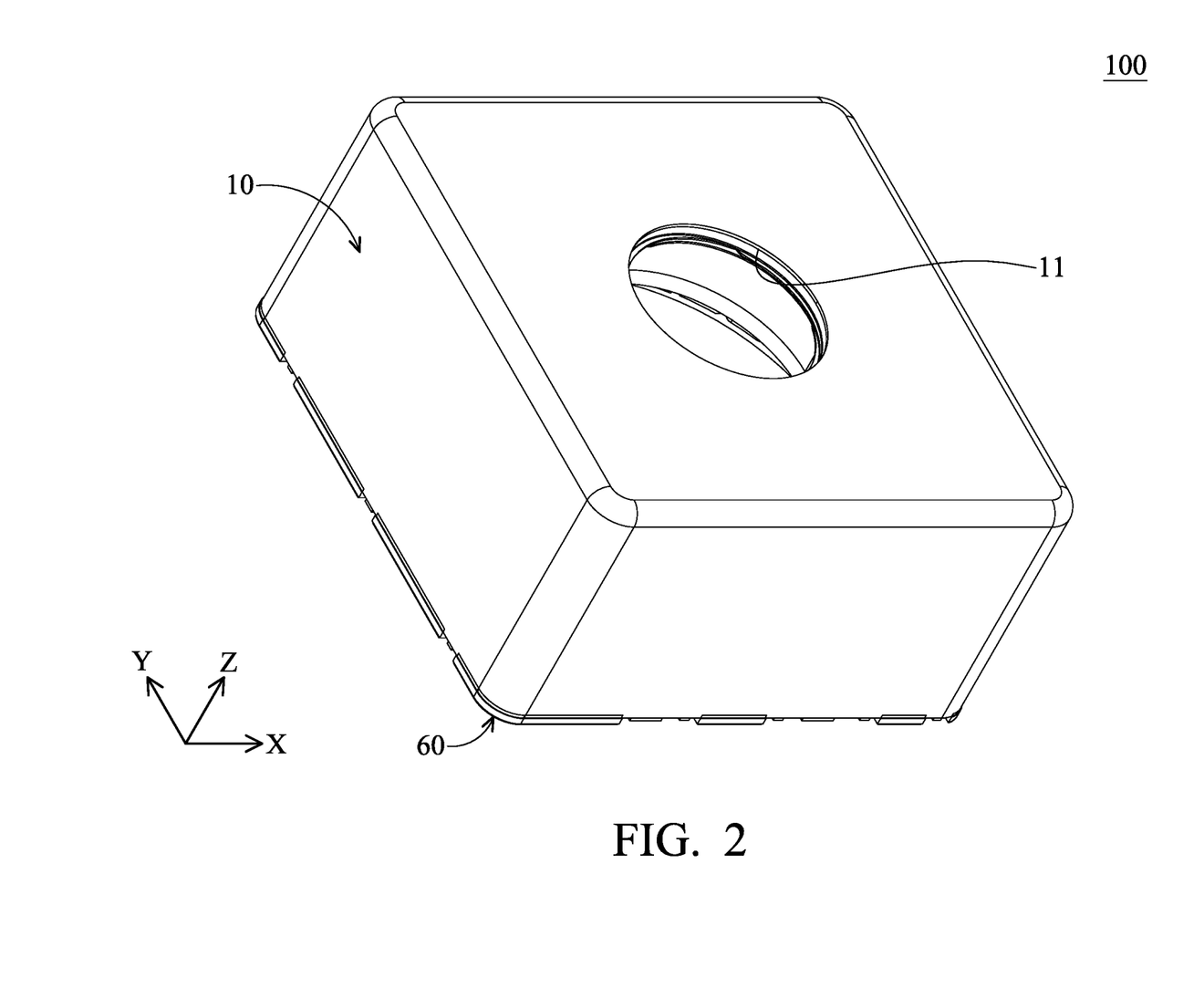
FIG. 2 is a perspective diagrams of the driving mechanism 100 in FIG. 1.
Figure 3:
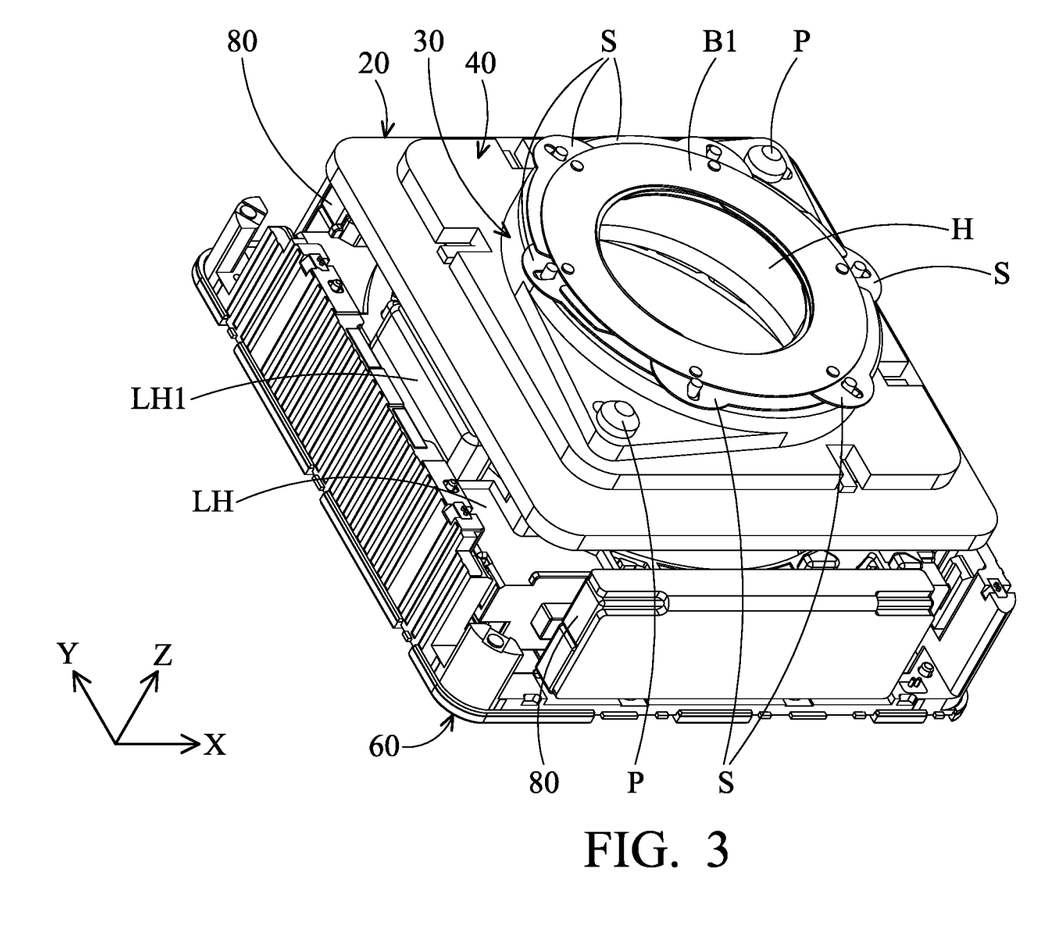
FIG. 3 is a perspective diagram of the driving mechanism 100 in FIG. 2 with the housing 10 omitted therefrom.
Figure 4:
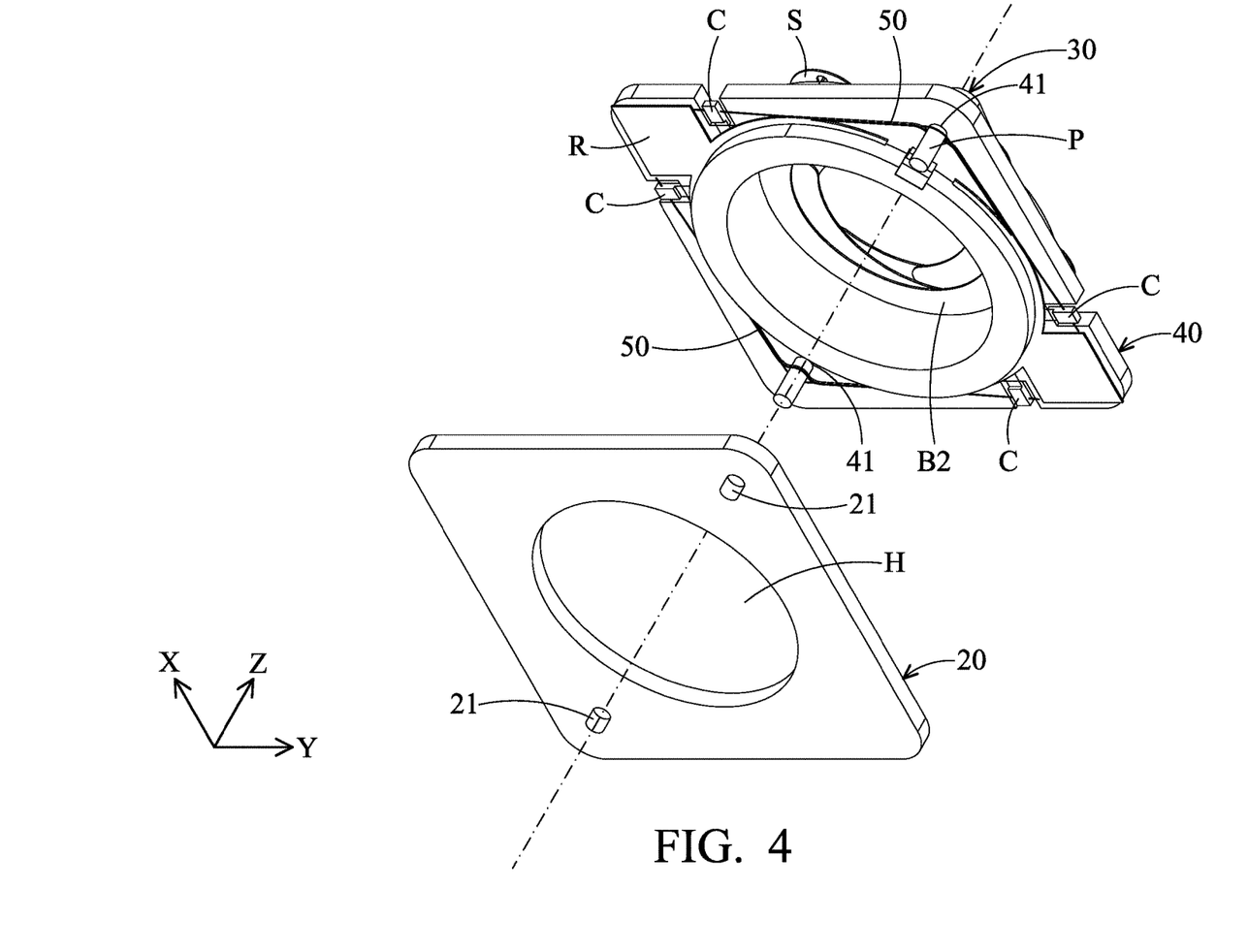
FIG. 4 is another exploded diagram of the driving mechanism 100 with the housing 10 omitted therefrom.

FIG. 1 is an exploded diagram of a driving mechanism 100 in accordance with an embodiment of the invention. FIG. 2 is a perspective diagrams of the driving mechanism 100 in FIG. 1. FIG. 3 is a perspective diagram of the driving mechanism 100 in FIG. 2 with the housing 10 omitted therefrom. FIG. 4 is another exploded diagram of the driving mechanism 100 with the housing 10 omitted therefrom.

As shown in FIGS. 1-4, an embodiment of a driving mechanism 100 primarily comprises a housing 10, two protecting elements B1, B2, several blades S, an annular movable part 30, at least a slider P, a frame 40, at least a first driving unit 50, a resilient element R, a bottom plate 20, a sensing magnet HM, a sensor HS, a holder LH, a base 60, and a second driving unit (including the coils 70 and the magnetic element 80), wherein the housing forms a hole 11.

The driving mechanism 100 in this embodiment includes a variable aperture (VA) module and a Voice Coil Motor (VCM) module. The movable part 30 is rotatably disposed around an annular flange 42 on the inner side of the frame 40. The blades S constitute a first optical unit, and the hinges 301, 401 on the movable part 30 and the frame 40 extend through the holes h1, h2 of the blades S, whereby the blades S can rotate relative to the movable part 30 and the frame 40. The blades S are configured to partially cover an opening H at the center of the frame 40, so as to regulate the quantity of light through the driving mechanism 100.

It should be noted that the frame 40 and the bottom plate 20 constitute a connecting part that connects to the holder LH. The holder LH may be movably connected to the base 60 via a spring sheet (not shown). Specifically, the holder LH forms at least a protrusion LH1 that is connected to the bottom plate 20.

The coils and magnetic elements 80 are disposed on the holder LH and the base 60, respectively. An electromagnetic force can be generated to impel the holder LH and a second optical unit (not shown) received therein along the Z axis. Therefore, the function of auto-focusing can be achieved, wherein the second optical unit may be an optical lens.

In this embodiment, the blades S (first optical unit), the movable part 30, the connecting part (frame 40 and the bottom plate 20), the holder LH, and the base 60 are sequentially arranged along the optical axis (Z axis) of the second optical unit.

Moreover, when the holder LH moves along the optical axis (Z axis) of the second optical unit to perform auto-focusing, the first optical unit can also be impelled along the optical axis (Z axis) via the connecting part (frame 40 and the bottom plate 20) and the movable part 30.

The sensing magnet HM and the sensor HS constitute a sensing nodule, wherein the sensor HS is disposed on the bottom plate 20 (e.g. PCB), and the sensing magnet HM is disposed on the movable part 30 and extends through an opening of the frame 40. In this embodiment, the sensor HS is a Hall sensor that can measure the displacement of the movable part 30 relative to the frame 40 by detecting the sensing magnet HM.

The frame 40 has a polygonal shape (e.g. quadrilateral shape), and the slider P comprises a guide pin located close to a corner of the frame 40. During assembly, the slider P extends through the rail 31 and the guiding structure 41 of the movable part 30 and the frame 40 to the longitudinal cavity 21 of the bottom plate 20, wherein the cavity 21 is parallel to the guiding structure 41.

Here, the rail 31, the guiding structure 41, and the cavity 21 are all longitudinal slots respectively formed through the movable part 30, the frame 40, and the bottom plate 20.

The first driving units 50 and the resilient element R are disposed at the bottom of the frame 40. Each of the first driving units 50 comprises a shaped-memory alloy (SMA) element. In this embodiment, the first driving unit 50 can be electrically connected to the bottom plate 20 (e.g. PCB) or external circuits via the conductive terminals C. The resilient element R may be a spring sheet, wherein the slider P are disposed between the first driving unit 50 and the resilient element R.

It should be noted that the slider P can be driven by the first driving unit 50 and the resilient element R to move back and forth along the rail 30 and the guiding structure 41. Therefore, rotation of the blades S and the movable part 30 can be controlled to appropriately regulate the quantity of light through the driving mechanism 100.

Still referring to FIGS. 1-4, two protecting elements B1, B2 are disposed on the top and bottom sides of the blades S, so as to block light and protect the blades S.

Figure 5:
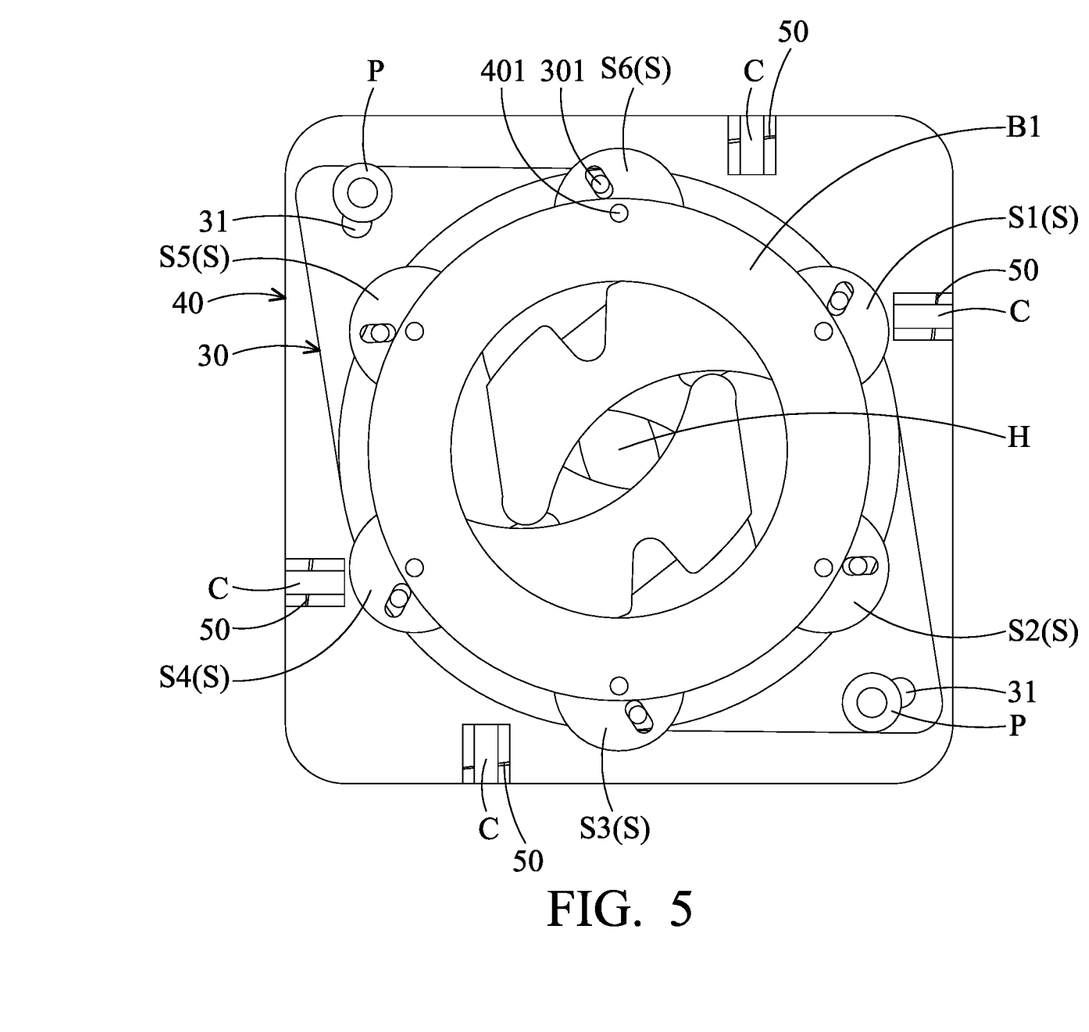
FIG. 5 is a schematic diagram showing that the blades S partially cover the opening H of the frame 40 when the movable part 30 in a first position relative to the frame 40.
Figure 6:
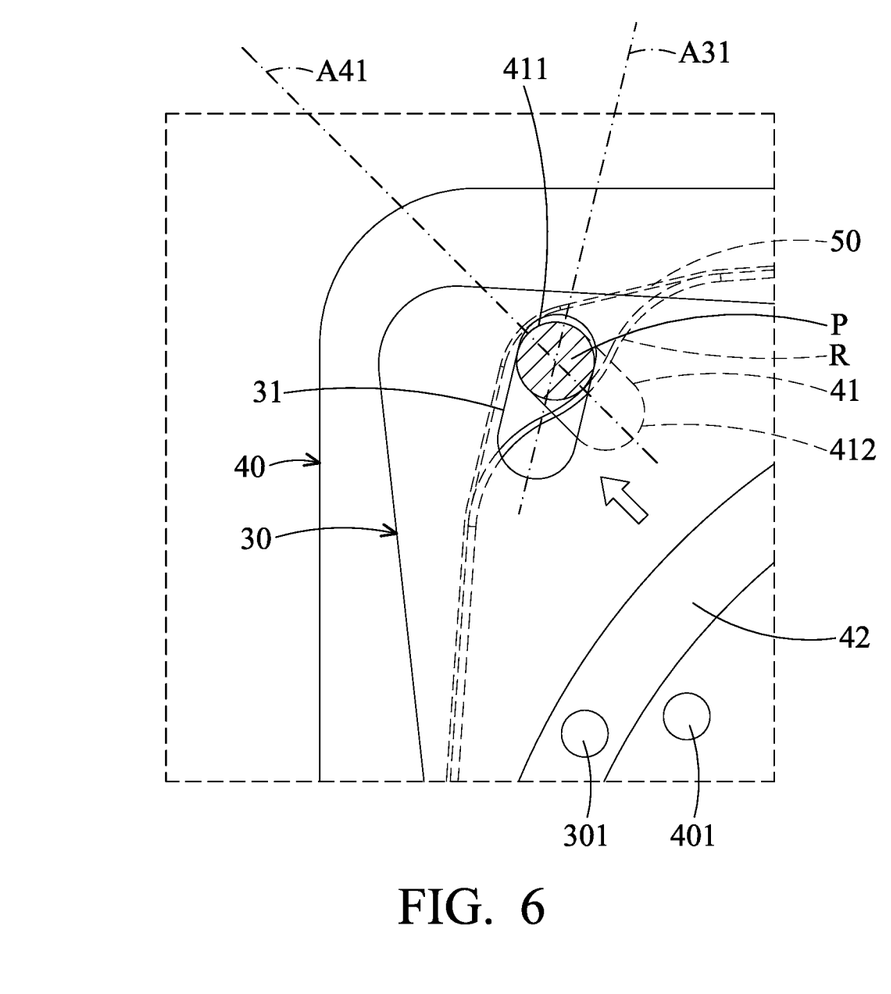
FIG. 6 is a schematic diagram showing that the slider P is at the first end 411 of the guiding structure 41 when the movable part 30 in the first position relative to the frame 40.

FIG. 5 is a schematic diagram showing that the blades S partially cover the opening H of the frame 40 when the movable part 30 in a first position relative to the frame 40. FIG. 6 is a schematic diagram showing that the slider P is at the first end 411 of the guiding structure 41 when the movable part 30 in the first position relative to the frame 40.

Referring to FIGS. 5 and 6, before a current signal is applied to the first driving unit 50 (SMA element), the resilient element R can exert an outward spring force on the slider P that extends through the movable part 30 and the frame 40, whereby the slider P is in contact with and positioned at the first end 411 of the guiding structure 41 (FIG. 6). In this state, the movable part 30 can be held in a first position relative to the frame 40, and the first driving unit 50 (SMA element) has a first length.

Figure 7:
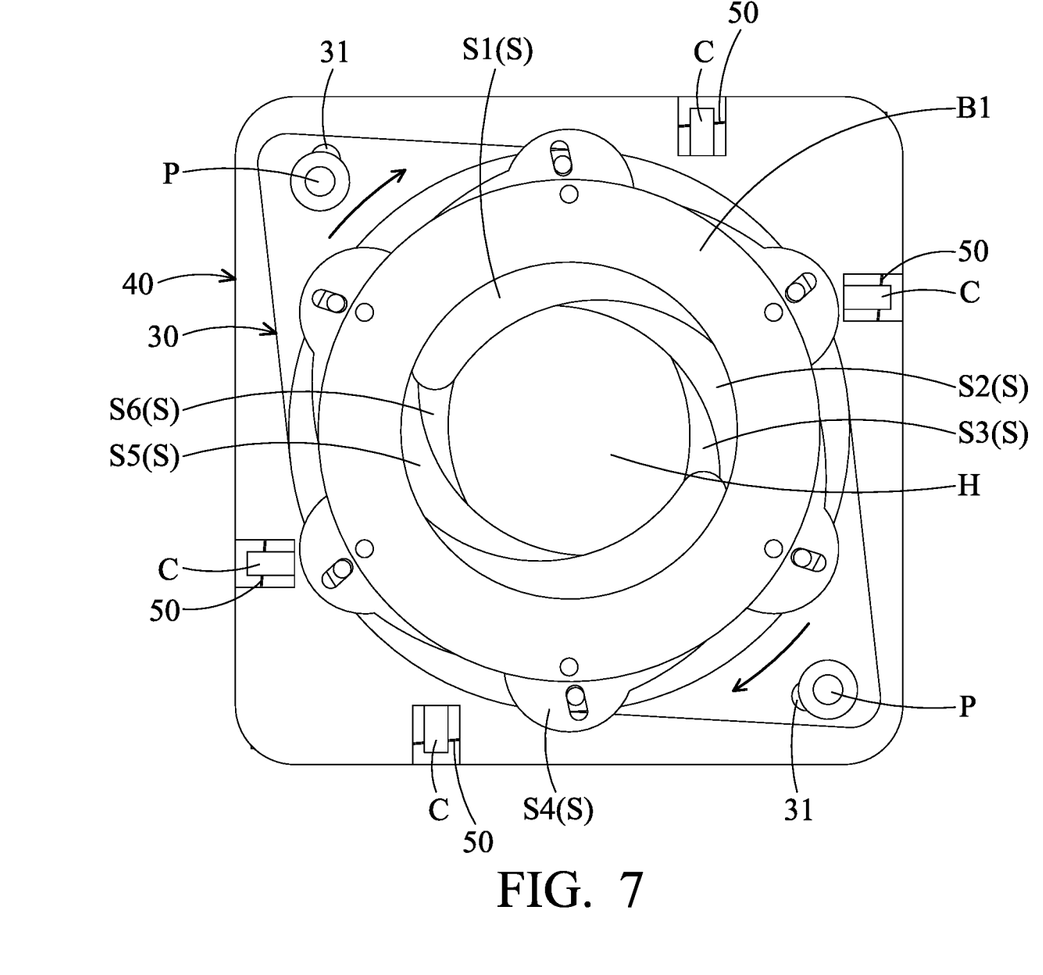
FIG. 7 is a schematic diagram showing that the movable part 30 rotates from the first position of FIG. 5 to a second position relative to the frame 40.
Figure 8:
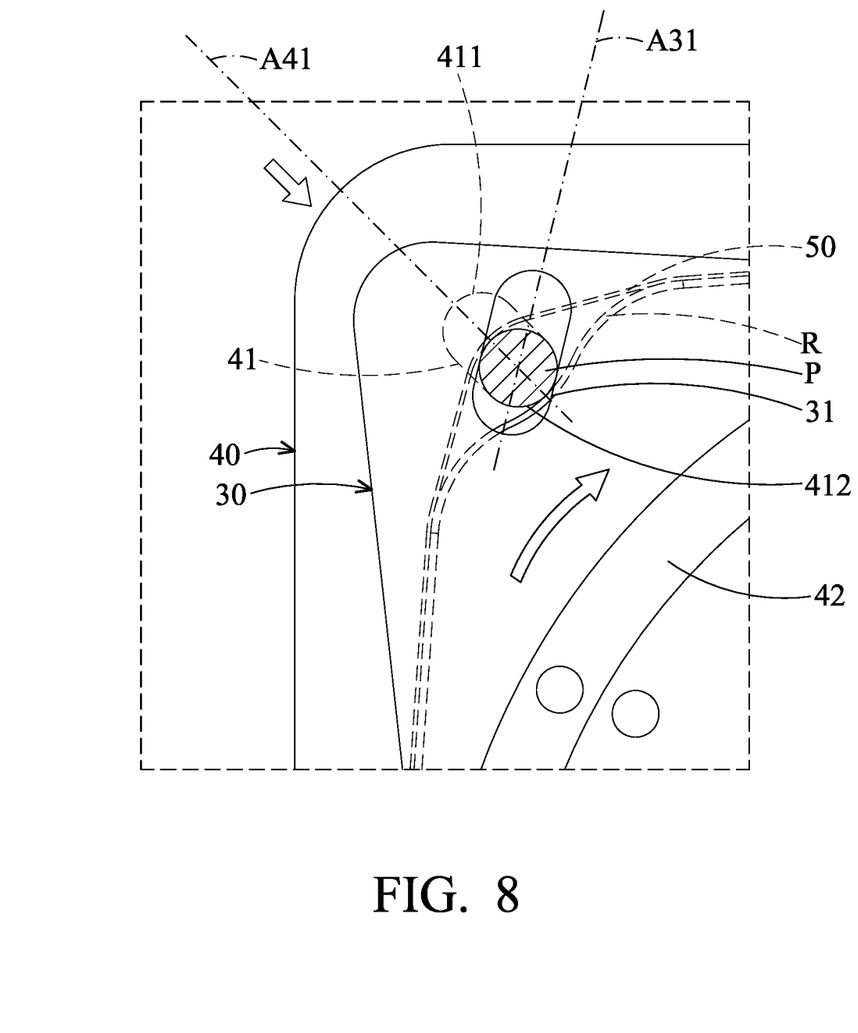
FIG. 8 is a schematic diagram showing that the slider P is at the second end 412 of the guiding structure 41 when the movable part 30 in the second position relative to the frame 40.

FIG. 7 is a schematic diagram showing that the movable part 30 rotates from the first position of FIG. 5 to a second position relative to the frame 40. FIG. 8 is a schematic diagram showing that the slider P is at the second end 412 of the guiding structure 41 when the movable part 30 in the second position relative to the frame 40.

Referring to FIGS. 7 and 8, the first driving unit 50 (SMA element) shrinks from the first length to a second length when a current signal is applied thereto. In this state, the first driving unit 50 can exert a shrinkage force on the slider P that extends through the movable part 30 and the frame 40. As a result, the slider P slides from the first end 411 along the guiding structure 41 to contact the second end 412, as the arrow indicates in FIG. 8. Moreover, the movable part 30 moves from the first position to the second position relative to the frame 40, and the blades S rotate relative to the movable part 30 and the frame 40, thus increasing the quantity of light through the driving mechanism 100.

It should be noted that the central axis A41 of the guiding structure 41 extends along a first direction and has a tilt angle (e.g. 45 degree) relative to a side of the frame 40. Specifically, the central axis A31 of the rail 31 extends along a second direction that is neither parallel nor perpendicular to the first direction.

In this embodiment, the included angle between the first and second directions ranges from 20 degree to 70 degree.

As shown in FIGS. 5 and 7, the blades S (first optical unit) include a first blade S1, a second blade S2, a third blade S3, a fourth blade S4, a fifth blade S5, and a sixth blade S6. Light can enter the driving mechanism 100 along an entry direction and propagate through the opening H. When viewed along the entry direction (Z direction), the first and second blades S1, S2 at least partially overlap, the first and third blades S1, S3 at least partially overlap, and the second and third blades S2, S3 at least partially overlap. Moreover, when viewed along the entry direction (Z direction), both of the protecting elements B1 and B2 at least partially overlap each one of the blades S.

Figure 9:
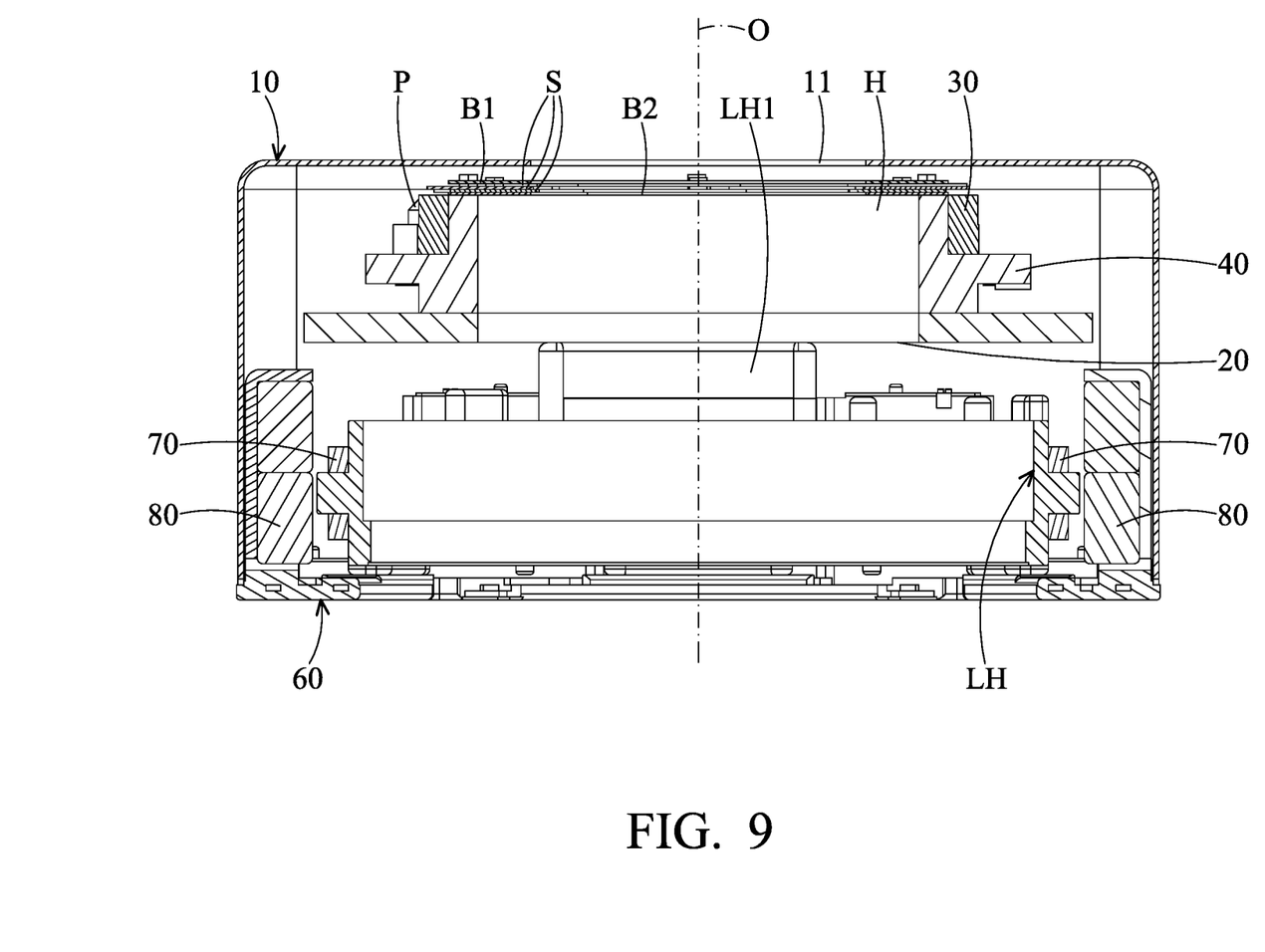
FIGS. 9 and 10 are cross-sectional views of the driving mechanism 100 from different directions.
Figure 10:
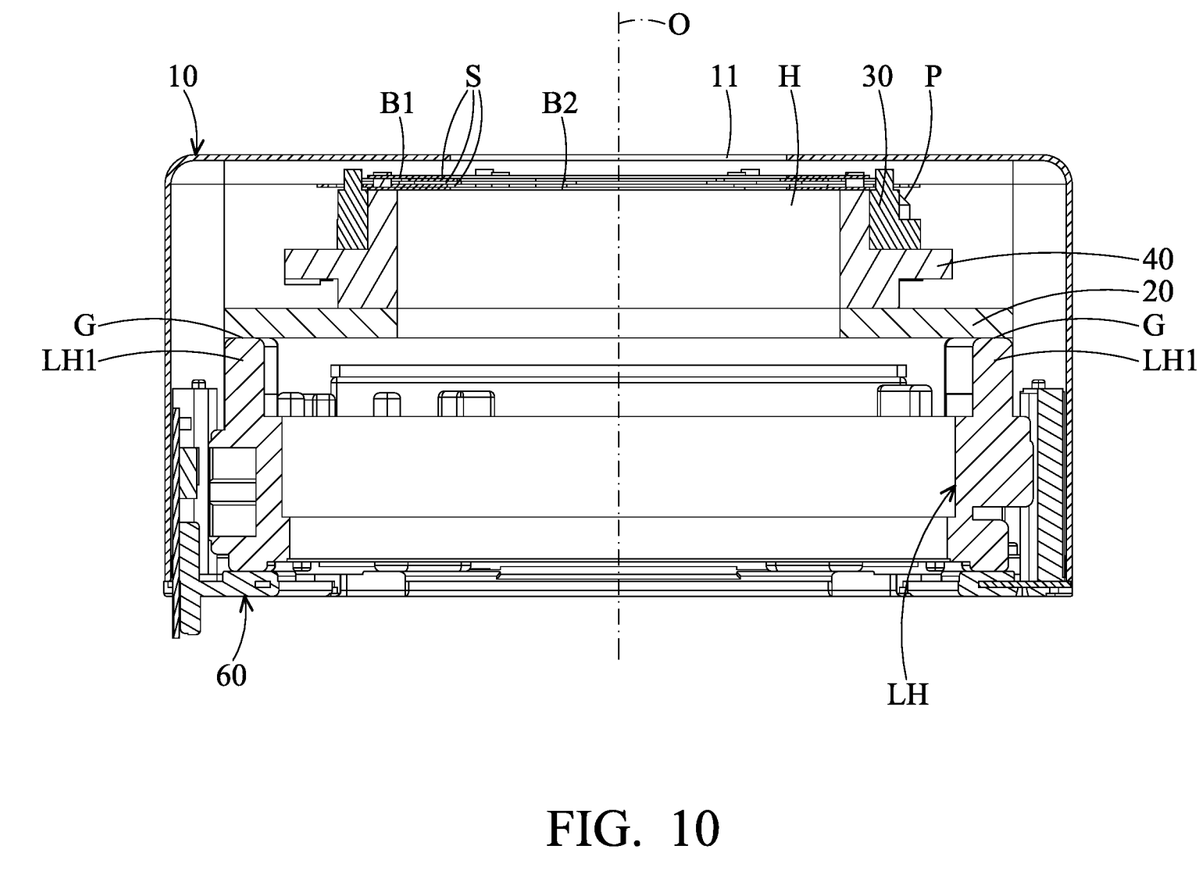

FIGS. 9 and 10 are cross-sectional views of the driving mechanism 100 from different directions.

As shown in FIGS. 1, 3, 9, and 10, the holder LH forms two protrusions LH1 extending toward the bottom plate 20. During assembly, the protrusions LH1 and the bottom plate 20 can be adhered to each other by glue, thus enhancing mechanical strength of the driving mechanism 100. Since the blades S (first optical unit) is impelled by the SMA element, electromagnetic interference to the coils 70 and the magnetic elements 80 can be efficiently prevented, thereby facilitating high efficiency and stability of the driving mechanism 100.

In FIG. 10, the bottom plate 20 is connected to the connection surfaces G of the protrusions LH1. When viewed along the optical axis O of the second optical unit L (FIGS. 11 and 12), the connection surfaces G are entirely covered by the housing 10. Similarly, the spring sheet (not shown) connecting the holder LH and the base 60 is also entirely covered by the housing 10 when viewed along the optical axis O. In this embodiment, the optical axis O is parallel to the entry direction (Z direction).

Figure 11:
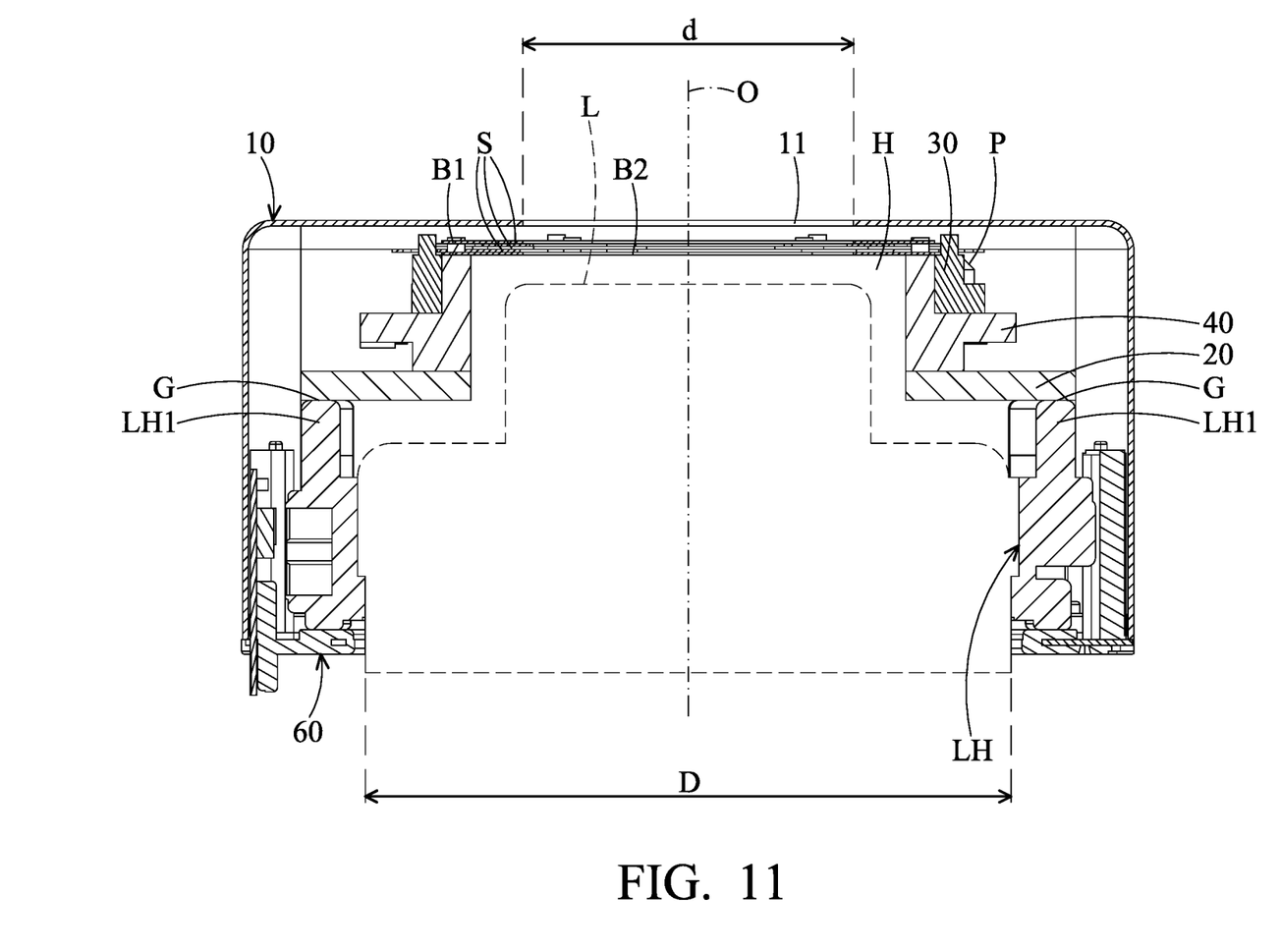
FIG. 11 is another cross-sectional view of the driving mechanism 100 with the second optical unit L disposed in the holder LH.

FIG. 11 is another cross-sectional view of the driving mechanism 100 with the second optical unit L disposed in the holder LH.

Referring to FIG. 11, a second optical unit L (e.g. optical lens) can be installed in the holder LH, and the second optical unit L may extends into the connecting part (the bottom plate 20 and the frame 40). In this embodiment, the second optical unit L extends through the bottom plate 20 to the opening H of the frame 40.

Additionally, the housing 10 forms a hole 11 that has a width d. The second optical unit L has a width W that is greater than the width d of the holder 11.

Figure 12:
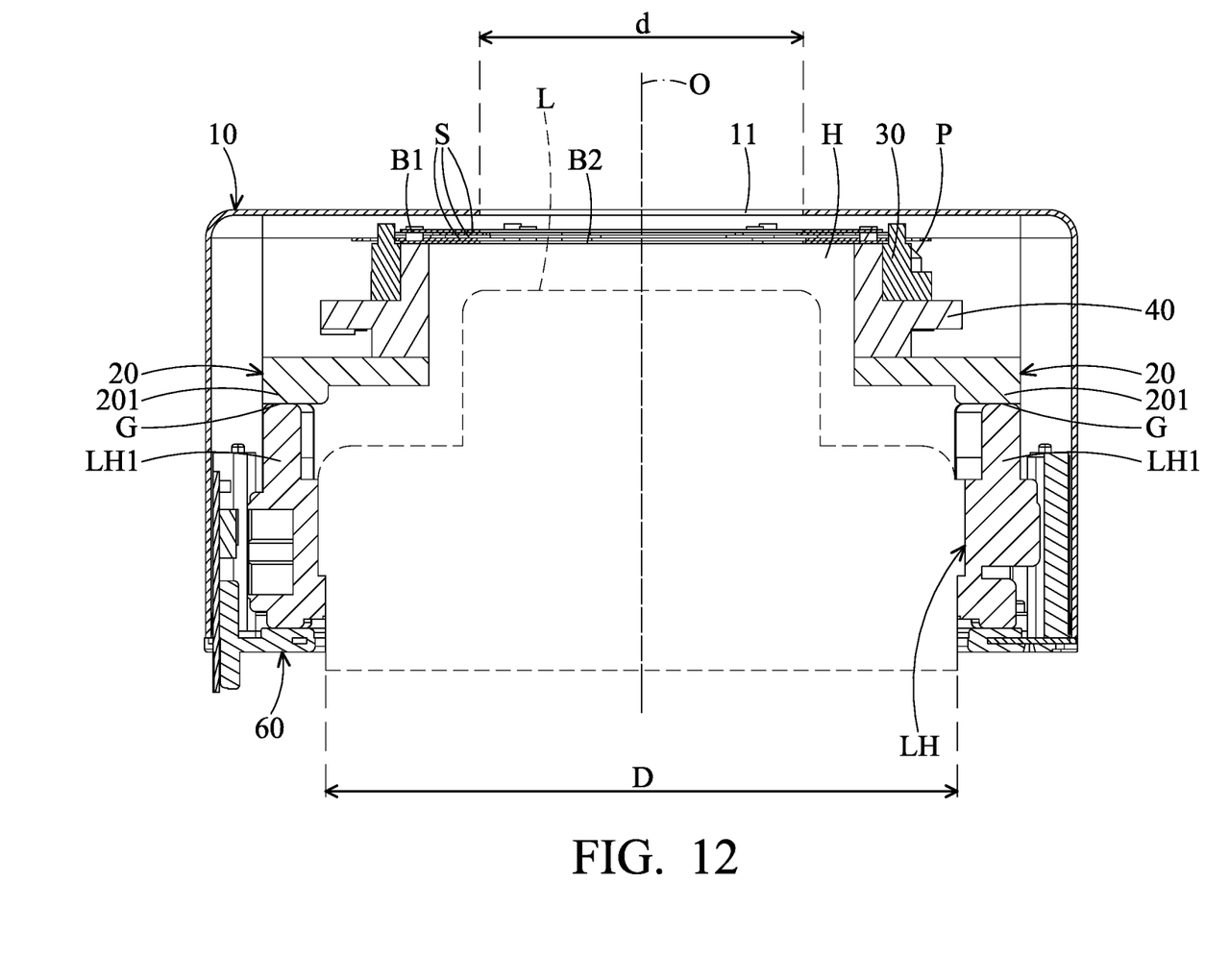
FIG. 12 is another cross-sectional view of the driving mechanism 100 in accordance with an embodiment of the invention.

FIG. 12 is another cross-sectional view of the driving mechanism 100 in accordance with an embodiment of the invention.

Referring to FIG. 12, the bottom plate 20 may form a protruding portion 201 toward the holder LH. During assembly, the protrusions LH1 and the protruding portion 201 can be adhered to each other by glue, thus enhancing mechanical strength of the driving mechanism 100.

In summary, the invention provides a driving mechanism 100 with a variable aperture (VA) module and a Voice Coil Motor (VCM) module incorporated in the same housing 10 to enhance mechanical strength of the driving mechanism 100. Moreover, as the blades S (first optical unit) is impelled by the SMA element, electromagnetic interference to the coils 70 and the magnetic elements 80 can be efficiently prevented, thereby facilitating high efficiency and stability of the driving mechanism 100.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving a first optical unit and a second optical unit, comprising:
    a movable part, connected to the first optical unit;
    a connecting part, connected to the movable part and forming a longitudinal guiding structure;
    a first driving unit, comprising an SMA element to impel the movable part and the first optical unit relative to the connecting part;
    a slider, movably disposed on the movable part and connected to the SMA element;
    a holder, connected to the second optical unit and the connecting part;
    a base, connected to the holder; and
    a second driving unit, configured to impel the holder and the second optical unit relative to the base;
    wherein the SMA element has a first length when the movable part is in a first position relative to the connecting part, and when a current signal is applied to the SMA element, the SMA element shrinks from a first length to a second length and impels the movable part from the first position to a second position relative to the connecting part;
    wherein the slider contacts a first end of the guiding structure when the movable part is in the first position relative to the connecting part, and when the slider is impelled by the SMA element along the guiding structure from the first end to a second end of the guiding structure, the movable part is pushed by the slider from the first position to the second position.

2. The driving mechanism as claimed in claim 1, further comprising a housing connected to the base, wherein the connecting part, the movable part, the first driving unit, the holder, the base, and the second driving unit are received in the housing.

3. The driving mechanism as claimed in claim 2, wherein the holder has a connection surface affixed to the connecting part, and the connection surface is covered by the housing when viewed along an optical axis of the second optical unit.

4. The driving mechanism as claimed in claim 2, wherein the housing forms a hole, and the width of the hole is less than the width of the second optical unit.

5. The driving mechanism as claimed in claim 2, wherein the holder forms a protrusion extending toward and connecting to the connecting part.

6. The driving mechanism as claimed in claim 5, wherein the connecting part includes a frame and a bottom plate, and the protrusion is connected to the bottom plate.

7. The driving mechanism as claimed in claim 2, wherein the connecting part forms a protruding portion extending toward and connecting to the holder.

8. The driving mechanism as claimed in claim 7, wherein the connecting part includes a frame and a bottom plate, and the protruding portion is formed on the bottom plate.

9. The driving mechanism as claimed in claim 2, wherein the second optical unit extends into the connecting part.

10. The driving mechanism as claimed in claim 2, wherein the first optical unit, the movable part, the connecting part, the holder, and the base are sequentially arranged along an optical axis of the second optical unit.

11. The driving mechanism as claimed in claim 1, wherein the guiding structure comprises a longitudinal slot.

12. The driving mechanism as claimed in claim 11, wherein the connecting part has a polygonal shape, and a tilt angle is formed between the guiding structure and a side of the connecting part.

13. The driving mechanism as claimed in claim 12, wherein the tilt angle is 45 degree.

14. The driving mechanism as claimed in claim 1, wherein the movable part has an annular structure with a longitudinal rail formed on it, and the slider extends through the rail to the guiding structure.

15. The driving mechanism as claimed in claim 14, wherein the rail extends in a first direction, and the guiding structure extends in a second direction that is neither parallel nor perpendicular to the first direction.

16. The driving mechanism as claimed in claim 15, wherein an included angle is formed between the first and second directions, and the included angle ranges from 20 degree to 70 degree.

* * * * *